US012679502B2

(12) United States Patent
Liao

(10) Patent No.: US 12,679,502 B2
(45) Date of Patent: Jul. 14, 2026

(54) ELECTRIC BALANCE BIKE

(71) Applicant: HL CORP (SHENZHEN), Shenzhen (CN)

(72) Inventor: Xuesen Liao, Shenzhen (CN)

(73) Assignee: HL CORP (SHENZHEN), Shenzhen (CN)

( * ) Notice: Subject to any disclaimer, the term of this patent is extended or adjusted under 35 U.S.C. 154(b) by 111 days.

(21) Appl. No.: 18/635,013

(22) Filed: Apr. 15, 2024

(65) Prior Publication Data

US 2024/0253734 A1 Aug. 1, 2024

Related U.S. Application Data

(63) Continuation-in-part of application No. 17/745,905, filed on May 17, 2022, now abandoned, which is a continuation of application No. PCT/CN2020/000287, filed on Nov. 23, 2020.

(51) Int. Cl.
| | |
|---|---|
| *B62M 7/04* | (2006.01) |
| *B62J 43/16* | (2020.01) |
| *B62J 45/20* | (2020.01) |
| *B62J 50/22* | (2020.01) |
| *B62K 3/10* | (2006.01) |
| *B62K 23/02* | (2006.01) |
| *B62M 9/02* | (2006.01) |

(52) U.S. Cl.
CPC ............... *B62M 7/04* (2013.01); *B62J 43/16* (2020.02); *B62J 45/20* (2020.02); *B62J 50/22*

(2020.02); *B62K 3/10* (2013.01); *B62K 23/02* (2013.01); *B62M 9/02* (2013.01)

(58) Field of Classification Search
CPC ... B62M 6/40; B62M 6/45; B62M 6/50; B62J 3/10; B62J 3/12; B62J 3/14
See application file for complete search history.

(56) References Cited

U.S. PATENT DOCUMENTS

| | | | | |
|---|---|---|---|---|
| 2017/0259879 | A1* | 9/2017 | Southey | ................... B62J 43/20 |
| 2018/0222549 | A1* | 8/2018 | Ragland | ................. B62K 11/14 |
| 2019/0263468 | A1* | 8/2019 | Huang | ................... B62K 15/00 |
| 2020/0411820 | A1* | 12/2020 | Ye | ............................ B62J 43/13 |
| 2021/0031871 | A1* | 2/2021 | Tetsuka | .................. B62K 23/02 |
| 2021/0061409 | A1* | 3/2021 | Ricco | ...................... B62L 1/005 |

* cited by examiner

*Primary Examiner* — Christopher B Wehrly
(74) *Attorney, Agent, or Firm* — Hemisphere Law, PLLC

(57) ABSTRACT

An electric balance bike includes an actuating assembly, a battery, and a power control system. The actuating assembly includes an actuator located below an intermediate section of a bike frame, a driving member located at an axle of a rear wheel, and a driving belt that is wrapped around the actuator and the driving member. The battery is detachably connected to the actuator. The power control system includes a controller, a power-on speed regulation control member, and a power-off brake control member, the controller is respectively electrically connected to the actuator and the battery, the power-on speed regulation control member and the power-off brake control member are located at the handlebar and are respectively connected to the controller to control the battery to supply power or not and control power outputting statuses of the actuator, so that a running speed of the electric balance bike is controlled.

10 Claims, 7 Drawing Sheets

ELECTRIC BALANCE BIKE

CROSS REFERENCE TO RELATED APPLICATIONS

The present application is a continuation-in-part application of International Application PCT/CN2020/000287, with an international filing date of Nov. 23, 2020, which claims foreign priority of Chinese patent application Ser. No. 201922167656.3, filed on Nov. 25, 2019 in the China National Intellectual Property Administration of China, the contents of all of which are hereby incorporated by reference.

BACKGROUND

1. Technical Field

The present disclosure generally relates to electric balance bikes using detachable batteries to supply power source for driving, and particularly to an electric balance bike having a power control system for controlling running speeds, which simplifies a design, has stable controllability, controlling a highest running speed thereof through changing of an operation program of the power control system, thereby ensuring safety of users with different riding capabilities.

2. Description of Related Art

Electric bicycles are a very common means of transportation. They not only allow people to travel conveniently, but also do not produce any waste gas such as carbon dioxide when moving, which has the effect of energy saving and environmental protection. Therefore, electric bicycles have gradually become the first choice for many people as a means of transportation.

As a vehicle with battery cells as power source, electric bicycles have roughly the same structure as ordinary bicycles. The only difference is that an electric bicycle has a battery unit and a motor electrically connected to the battery unit as driving power. The motor uses the power of the battery unit as a power source, and drives the wheels of the electric bicycle to rotate, thereby driving the electric bicycle to move.

Conventional electric bicycles each generally has a motor mounted on a bicycle frame and being connected by chains. Current electric bicycles generally provide front wheel hub motors on front wheel hubs or provide rear wheel hub motors on rear wheel hubs, or, provide wheel-side motors beside wheel hubs. Such configuration has many disadvantages, first, a center of gravity of the a bicycle body is concentrated on a front part or a rear part thereof, and a position of the center of gravity may reduce a balance degree of the vehicle body, thereby affecting riding stability; second, since a corresponding front wheel hub motor is arranged on a corresponding front wheel, and a corresponding rear hub motor is arranged on a corresponding rear wheel, such configuration may increase maintenance difficulty during maintenance of the front wheel or the rear wheel.

In order to overcome above disadvantages, one motor in the prior art is moved to a middle part of a corresponding vehicle body, so that a center of gravity of the corresponding vehicle body is moved from a front part or a rear part thereof to the middle part, such motor is generally referred to as a mid-drive motor. The mid-drive motor is required to have an output with a low rotation speed and a high torque to meet riding requirements of the corresponding vehicle body. Therefore, in order to obtain a power source output with the low rotation speed and the high torque, a planetary reducer having a low reduction ratio is additionally arranged on the mid-drive motor.

However, since the planetary reducer has the low reduction ratio, a rotation speed of the mid-drive motor cannot be greatly reduced and a torque thereof cannot be greatly improved. As a result, if the power source output with the low rotation speed and the high torque needs to be achieved, a motor having a medium-low rotation speed and a medium-high torque needs to be adopted, so that the requirement of providing the power source output with the low rotating speed and the high torsion for riding can be met. Compared the motor having the medium-low rotation speed and the medium-high torque with a motor having a high rotation speed and a low torque, the motor having the medium-low rotation speed and the medium-high torque is large in size, heavy in weight, high in cost, etc. Although the mid-drive motor is large in size and heavy in weight, it is still applicable to general bicycles. However, for scooters for children to learn and train riding skills, since sizes of vehicle bodies of the scooters are small, providing conventional mid-drive motors in the scooters may enlarge the sizes of the vehicle bodies of the scooters, weights of the scooters are further increased, so that the children cannot well control the scooters when using.

Currently, vehicles for children, such as electric bikes and electric scooters, generally control speeds by rotating grips; however, no matter which type of driving manner described above, once a traveling speed exists, a certain coordination and reaction force needs to be required in operation, so that not each user may do well in controlling. In addition, once a deceleration brake is required to be encountered, the users may not be able to take a reaction in real time, which may increase risks of using the vehicles.

SUMMARY

Based on above, the present disclosure aims to provide an electric balance bike using a detachable battery to supply power source for driving, and particularly to an electric balance bike having a power control system for controlling running speeds, which simplifies a design and has stable controllability.

The present disclosure provides the electric balance bike, including a bike frame, a front fork, a handlebar, a front wheel, a rear wheel, an actuating assembly, a battery, and a controller. The bike frame includes a seat at an intermediate position thereof, a head tube at a front end thereof, and a rear fork at a rear end thereof. The front fork is connected to a lower end of the head tube. The handlebar is connected to the head tube, and is configured to control rotation of the front fork. The front wheel is connected to the front fork. The rear wheel is connected to the rear fork. The actuating assembly is arranged between the bike frame and the rear wheel, the actuating assembly includes an actuator located below an intermediate section of the bike frame, a driving member located at an axle of the rear wheel, and a driving belt that is wrapped around the actuator and the driving member. The battery is detachably connected to the actuating assembly. The electric balance bike further includes a power control system, the power control system includes a controller, a power-on speed regulation control member, and a power-off brake control member, the controller is respectively electrically connected to the actuator and the battery, the power-on speed regulation control member and the power-off brake control member are located at the handlebar and are respectively connected to the controller to control the battery to supply power or not and control power outputting statuses of the actuator, so that a running speed of the electric balance bike is controlled.

When the actuator is driven by electric power for actuation, the driving belt drives the electric balance bike to move, and the power outputting statuses of the actuator is controlled by using the power control system, so as to control the running speed of the electric balance bike, as long as changes of operation programs, such as numbers and times of pressing, of control members, such as the power-on speed regulation control member and the power-off brake control member are controlled, the actuation of the power member may be stable, which is convenient for users to control and greatly simplifies a structural design thereof.

Furthermore, the power-on speed regulation control member and the power-off brake control member are respectively arranged at a left side and a right side of the handlebar, and the power-on speed regulation control member includes a reset button and a speed regulator.

Furthermore, the battery starts to supply power if a user continuously presses the reset button at a predetermined time; and the power outputting statuses of the actuator is switched if the user continues to press the power-off brake control member and the reset button.

Furthermore, the power control system further includes a buzzer, the buzzer is connected to the controller and is configured to inform the power outputting statuses of the actuator.

Furthermore, the power control system further includes a display, the display is connected to the controller and is configured to display power statuses of the battery.

Furthermore, the controller controls the power outputting statuses of the actuator, so that the actuator has at least two different rotating speed statuses.

Furthermore, the battery is a rechargeable lithium battery for hand tools.

Furthermore, a toothed disc is connected to a shaft of the actuator. The actuator is laterally arranged below the intermediate section of the bike frame, and the driving belt is wrapped around the driving member and the toothed disc.

Furthermore, the actuator is a brushless motor.

Figure 1:
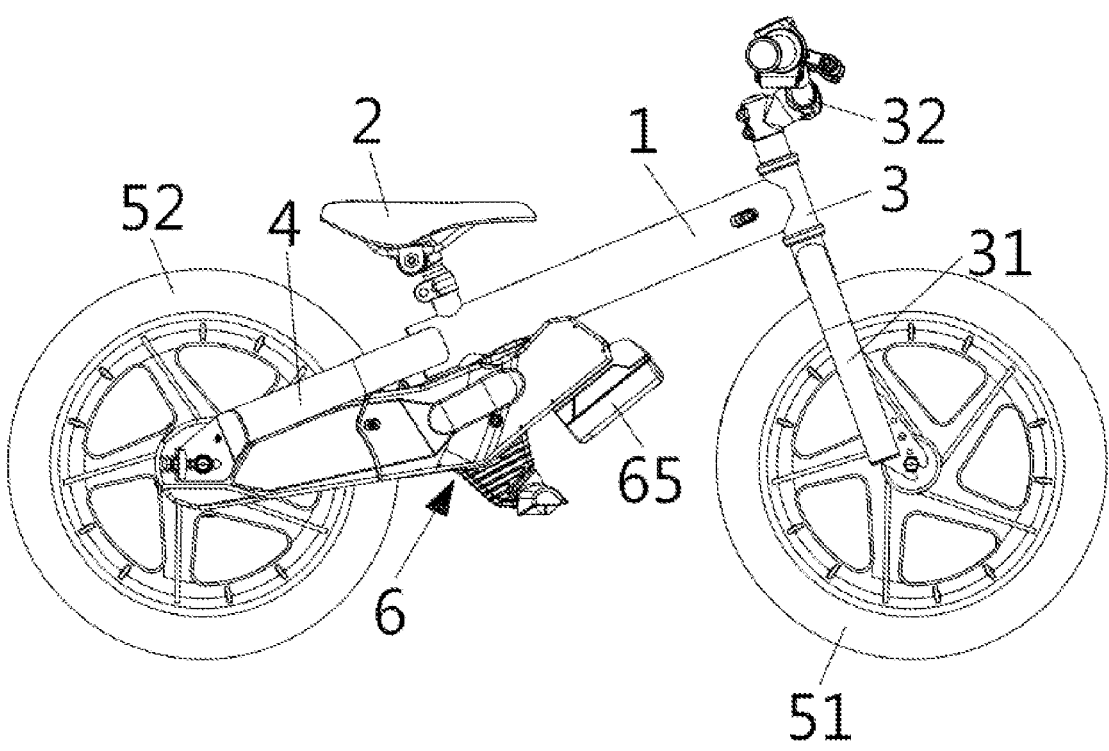
FIG. 1 is a structural schematic diagram of an electric balance bike according to one embodiment of the present disclosure.

REFERENCE NUMERALS IN THE DRAWINGS 1. bike frame; 2. seat; 3. head tube; 31. front fork; 32. handlebar; 4. rear fork; 51. front wheel; 52. rear wheel; 6. actuating assembly; 61. actuator; 62. driving member; 63. driving belt; 64. toothed disc; 65 battery; 7. power control system; 70. power abnormality response system; 701. determination component; 702. detection component; 7021. heat sensing member; 7022. timing member; 703. warning component; 71. controller; 72. power-on speed regulation control member; 721. reset button; 722. speed regulator; 73. power-off brake control member; 74. buzzer; 75. display; 76. meter.

DETAILED DESCRIPTION

In order to facilitate the examiner to understand technical features, content, and advantages of the present disclosure and effects achieved thereby, the present disclosure is described in detail with reference to accompanying drawings and is described in detail in a form of an embodiment, the accompanying drawings used therein are for purposes of illustration and description only and the contents therein are not necessarily a true scale and an accurate configuration after implementation of the present disclosure, so it should be understood that ratios and configuration relationships of the accompanying drawings should not be construed as limiting a scope of the present disclosure in practice.

Figure 2:
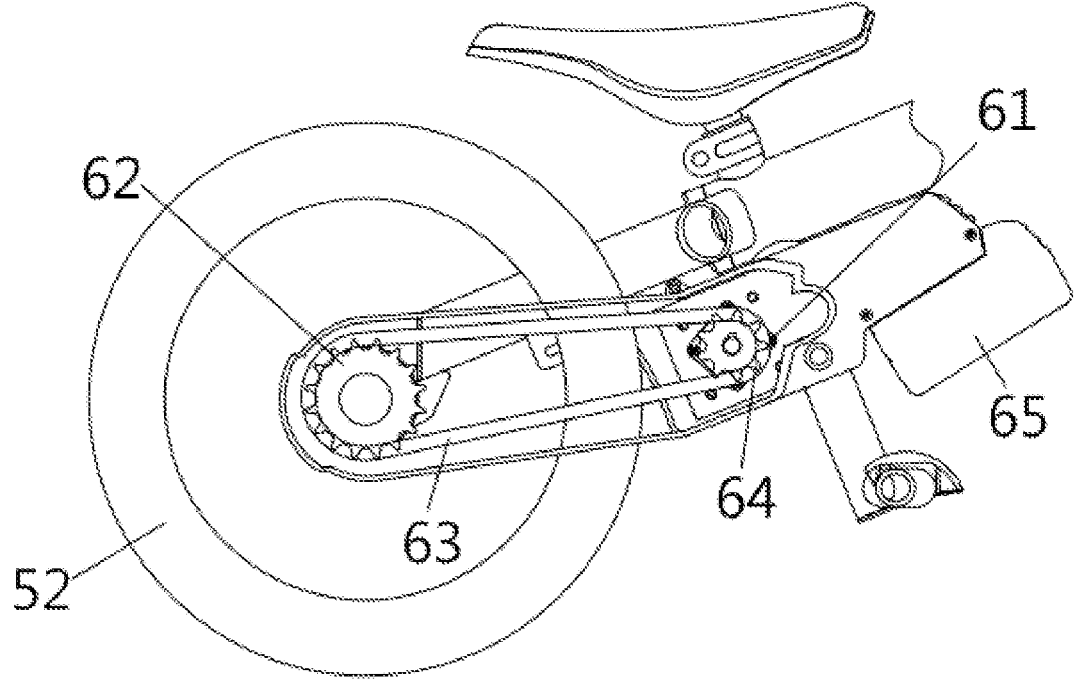
FIG. 2 is a structural schematic diagram of an actuating assembly of the electric balance bike according to one embodiment of the present disclosure.

Please refer to FIGS. 1, FIG. 1 is a structural schematic diagram of an electric balance bike according to one embodiment of the present disclosure, the electric balance bike includes a bike frame 1, a front fork 31, a handlebar 32, a front wheel 51, a rear wheel 52, an actuating assembly 6, a battery 65, and a controller 7. The bike frame 1 includes a seat 2 at an intermediate position thereof, a head tube 3 at a front end thereof, and a rear fork 4 at a rear end thereof. The front fork 31 is connected to a lower end of the head tube 3. The handlebar 32 is connected to the head tube 3, and is configured to control rotation of the front fork 31. The front wheel 51 is connected to the front fork 31. The rear wheel 52 is connected to the rear fork 4. The actuating assembly 6 is arranged between the bike frame 1 and the rear wheel 52, the actuating assembly 6 includes an actuator 61 located below an intermediate section of the bike frame 1, a driving member 62 located at an axle of the rear wheel 52, and a driving belt 63 that is wrapped around the actuator 61 and the driving member 62. Please further refer to FIG. 2, a toothed disc 64 is connected to a shaft of the actuator 61. The actuator 61 is laterally arranged below the intermediate section of the bike frame 1, and the driving belt 63 is wrapped around the driving member 62 and the toothed disc 64. In one embodiment, the driving member 62 may be in the form of a toothed disc, and the battery 65 is detachably connected to the actuating assembly 6.

Figure 3:
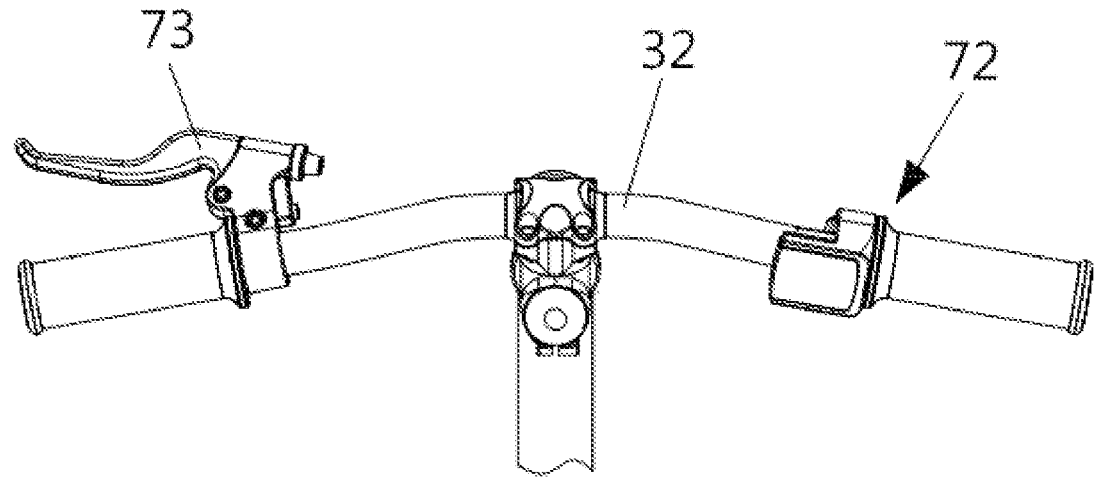
FIG. 3 is a structural schematic diagram of a handlebar of the electric balance bike according to one embodiment of the present disclosure.

A focus of the present disclosure is as following. The electric balance bike further includes a power control system 7, please further refer to FIGS. 3 and 4, the power control system 7 includes a controller 71, a power-on speed regulation control member 72, and a power-off brake control member 73, the controller 71 is respectively electrically connected to the actuator 61 and the battery 65, the power-on speed regulation control member 72 and the power-off brake control member 73 are located at the handlebar 32 and are respectively connected to the controller 71 to control the battery 65 to supply power or not and control power outputting statuses of the actuator 61, so that a running speed of the electric balance bike is controlled.

Figure 4:
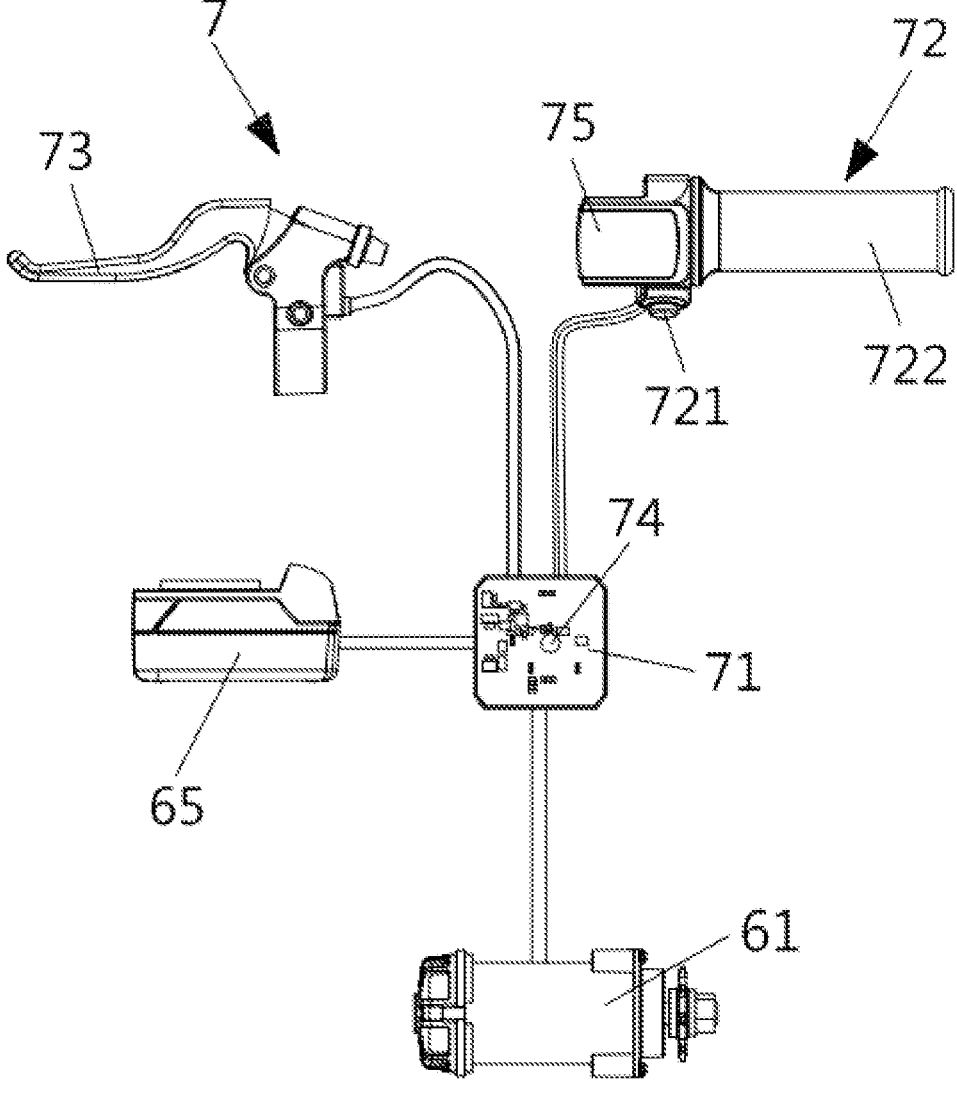
FIG. 4 is a structural schematic diagram of a power control system according to a first embodiment of the present disclosure.
Figure 5:
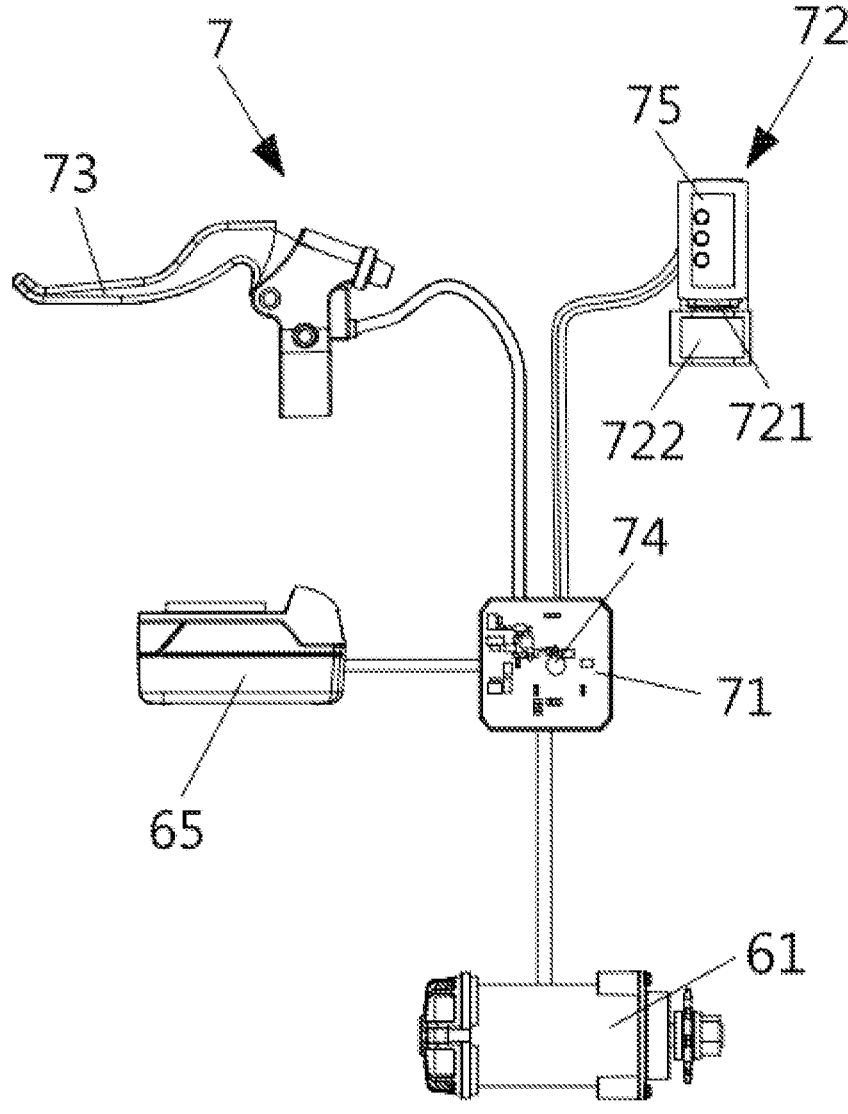
FIG. 5 is a structural schematic diagram of the power control system according to a second embodiment of the present disclosure.
Figure 6:
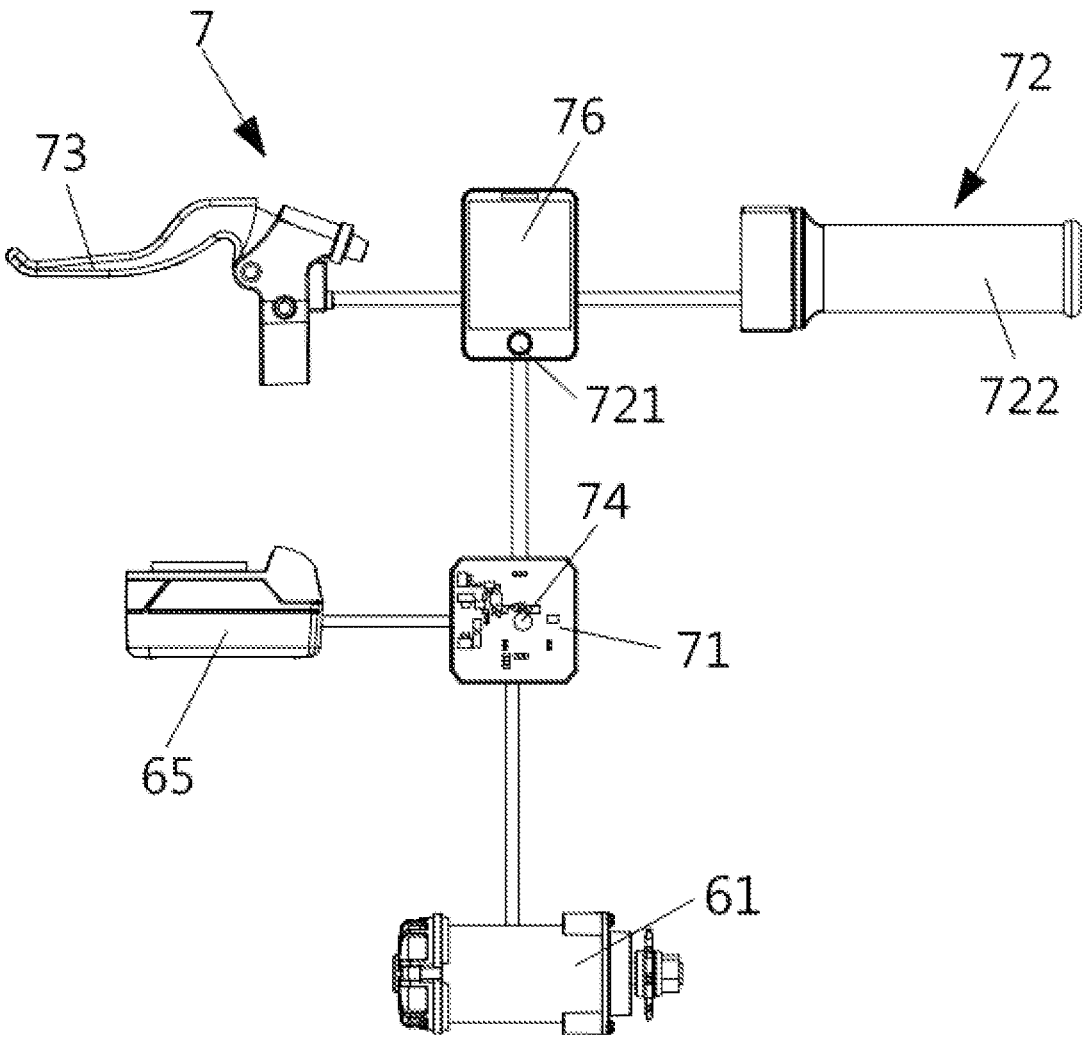
FIG. 6 is a structural schematic diagram of the power control system according to a third embodiment of the present disclosure.

In one embodiment, the power-on speed regulation control member 72 and the power-off brake control member 73 are respectively arranged at a left side and a right side of the handlebar 32, and the power-on speed regulation control member 72 includes a reset button 721 and a speed regulator 722. As shown in FIG. 4, the reset button 721 is a button, the speed regulator 722 is a handlebar structure arranged on the left side of the handlebar 32, the power-off brake control member 73 is a pulling rod arranged on the right side of the handlebar 32, and the controller 71 is a circuit board. The power control system 7 further includes a buzzer 74 and a display 75, the buzzer 74 is connected to the controller 71, and is capable of being directly connected to the controller 71, the buzzer 74 is configured to inform running statuses of the actuator 61 and the battery 65, and the display 74 is configured to display power statuses of the battery 65. As shown in the accompanying drawings, the reset button 721, the speed regulator 722, and the display 75 are integrated into the power-on speed regulation control member 72 to be a modular structure. Certainly, as shown in FIG. 5, in one embodiment, the speed regulator 722 is a deflector rod structure, the display is capable of being structured in different forms, the reset button 721, the speed regulator 722, and the display 75 are integrated into the power-on speed regulation control member 72 to be a modular structure; or, the controller 7 is directly connected to a meter 76, the meter 76 replaces the display, and the meter 76 displays the power outputting statuses of the actuator 61 and the power statuses of the battery 65. The reset button 721 may also be integrated on the meter 76, and the buzzer 74 is capable of sending out a warning reminder for electronic control abnormality or insufficient power supply.

When using the electric balance bike, the battery 65 is assembled on the bike frame 1, users may set the power outputting statuses of the actuator 61 according to the changes of operation programs, such as numbers and times of pressing different control members. The battery 65 starts to supply power if a user continuously presses the reset button 721 at a predetermined time, for example, the reset button may be pressed for 2-3 seconds to turn on a power supply, and the battery 65 starts to supply the power, and at this time, the buzzer 74 sounds to inform the power outputting statuses of the actuator 61 controlled by the controller 71, and the display 75 displays the power statuses of the battery 65. Specifically, the actuator 61 is preset to have at least two different rotating speed statuses and further provides corresponding speed limitations on the electric balance bike under different power outputting statuses; for example, the actuator 61 has three rotating speed statuses, including a first rotating speed status, a second rotating speed status, and a third rotating speed status, and the buzzer 74 may respectively sound three times corresponding to the first rotating speed status, the second rotating speed status, and the third rotating speed status.

When the controller 71 changes the power outputting statuses of the actuator 61, the power output statuses of the actuator 61 are further changed if the user continues to press the power-off brake control member 73 and the reset button 721. For example, when the actuator 61 is in the first rotating speed status, the power-off brake control member 73 is pressed first, and the reset button 721 is continuously pressed twice within 1.5 seconds, so that a corresponding power outputting status of the actuator 61 is switched from the first rotating speed status to the second rotating speed status, and the buzzer 74 sounds twice to inform that the actuator 61 is currently in the second rotating speed status, and the user may control the speed regulator 722 to accelerate when the actuator 61 is in the second rotating speed status. When the user presses the power-off brake control member 73, the electric balance bike brakes and is powered off at the same time to prevent electronic control from being blocked and damaged. When the electric balance bike is turned off, the user presses the reset button 721, so that the battery 65 stops supplying power, for example, the reset button 721 is pressed for 2-3 seconds to turn off the power supply.

In addition, the present disclosure may further use the controller 71 to achieve following settings. If the power control system 7 is not in use, after a preset time, such as 1 minute, the electric balance bike may enter an automatic turn-off mode; or when the electric balance bike is detected to be fault or the battery 65 is detected to be out of power, the buzzer 74 sends out a sound signal with one long and two short sound cooperating with squawks for informing the users; or when using the speed regulator 722 of the power-on speed regulation control member 72 to operation, the reset button 721 cannot act, so as to ensure safety.

In one embodiment, the battery 65 is a rechargeable lithium battery for hand tools, and the actuator 61 can be a brushless motor or other actuators that can provide rotating power, such as a brush motor. The rechargeable lithium battery used for hand tools in this embodiment is not only small in size and light in weight, but also only needs to be connected by slidable plugging, which increases the convenience of use. Compared with lead-acid batteries, the use of the rechargeable lithium battery has the following advantages.

1. Small size: The weight of a lead-acid battery is typically 16-30 kg, and the size is large. A lithium battery is typically 2.5-3 kg and relatively small in size. As a result, it is easy to carry and replace, and is more suitable for use in the bike for short-range/short-time riding in this embodiment.
2. High durability: Lead-acid batteries generally have a deep charge and deep discharge of less than 300 cycles, and their lifespan is about two years. There is liquid in the lead-acid batteries. After a period of consumption, if it is found that the batteries are hot or the charging time is shortened, liquid needs to be added into the batteries. Lithium batteries have strong durability, slow consumption, and can be charged and discharged more than 500 cycles, with a typical lifespan of 4-5 years.
3. Environmentally friendly: Lead-acid batteries may cause pollution during the production process, and may also cause pollution if they are not recycled properly. Lithium batteries are relatively environmentally friendly.

The use of a brushless motor may offer several advantages as described below.

1. High efficiency: Higher performance than ordinary motors (high efficiency, high torque, high stability). 2. Small size: Space saving, low electromagnetic interference, and maintenance-free carbon brush. 3. The rotor size is much smaller than traditional induction motors and brushed motors, thereby providing better control performance. 4. Built-in motor driver that operates at a DC voltage of 18V.

Figure 7:
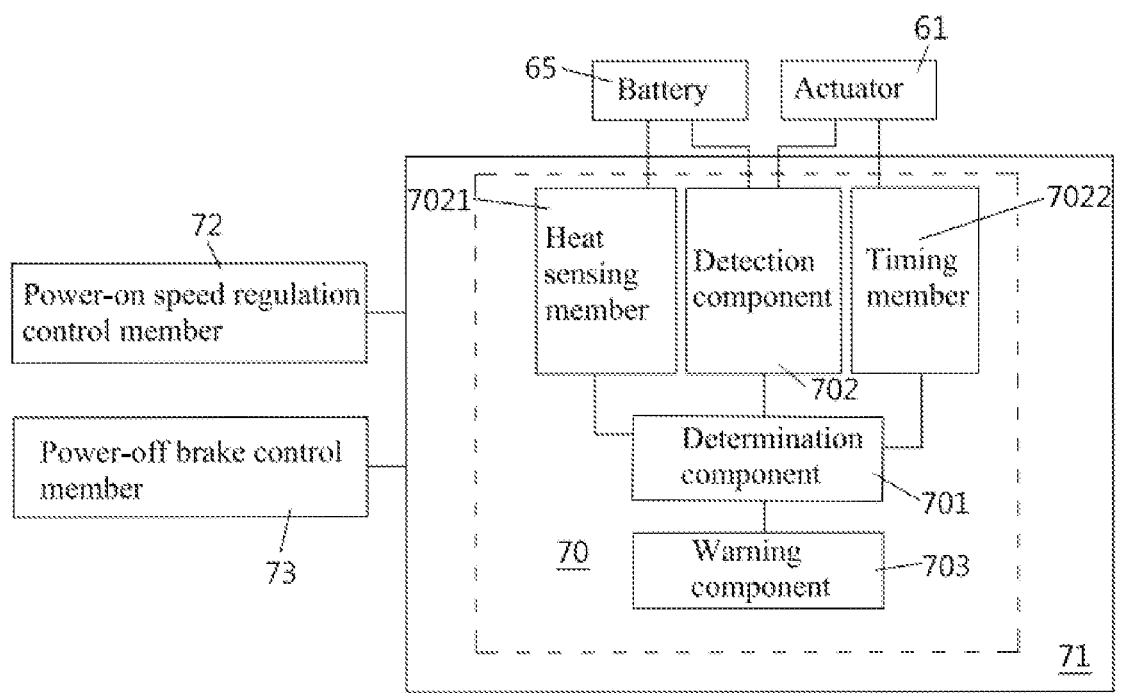
FIG. 7 is a structural schematic diagram of the power control system according to a fourth embodiment of the present disclosure.

Furthermore, the power abnormality response system 70 is arranged in the controller 71, as shown in FIG. 7, the power abnormality response system 70 includes a determination component 701, detection components 702, and a warning component 703, the determination component 701 is respectively connected to the detection components 702 and the warning component 703, the detection components 702 are connected to the actuator 61 and the battery 65, the detection components 72 respectively detect running statuses of the actuator 61 and the battery 65 and output detection values, the determination component 710 receives the detection values and determines whether the detection values are abnormal or not to output different control signals to drive the warning component 703 to respectively send out different warning signals.

In one embodiment, the detection components 702 are connected to the actuator 61, the battery 65, the power-on speed regulation control member 72, and the power-off brake control member 73. The detection components 702 respectively detect the running statuses of members, such the actuator 61, the battery 65, the power-on speed regulation control member 72, and the power-off brake control member 73, and output corresponding detection values, the determination component 701 receives the corresponding detection values and determines whether the corresponding detection values are abnormal or not to output different control signals to drive the warning component 703 to respectively send out different warning signals.

In one embodiment, the detection components 702 include voltage feedback circuits, the battery 65 is connected to the voltage feedback circuits, so that a voltage of the battery 65 is detected to confirm an electric quantity of the battery 65. The detection components 702 include current feedback circuits, the actuator 61 is connected to the current feedback circuits, so that a current of the actuator 61 is detected. The detection components 702 include heat sensing members 7021, the heat sensing members 7021 are respectively connected to the members, such as the actuator 61, the battery 65, the power-on speed regulation control member 72, and the power-off brake control member 73, for detecting running temperatures. The detection components 702 include timing members 7022, the timing members 7022 are connected to the members, such as the actuator 61, the battery 65, the power-on speed regulation control member 72, and the power-off brake control member 73, for detecting running times. The warning component 703 is a buzzer and is capable of sending out a sound warning signal; or, the warning component 703 is a display or a meter and is capable of sending out an image warning signal. Certainly, the warning 703 may also be integrated with the buzzer 74 and/or the display 75 as described above.

When using the electric balance bike, the battery 65 is assembled on the bike frame 1, users may set the power outputting statuses of the actuator 61 according to the changes of the operation program of the controller 7, so that the actuator 61 has at least two different rotating speed statuses and the actuator 61 provides corresponding speed limitations on the electric balance bike under different power outputting statuses, therefore, a highest running speed of the electric balance bike is controlled, so as to ensure safety of users with different riding capabilities. In a riding process, the detection components 702 perform detection at the same time and transmit the detection values to the determination component 701, and the determination component 701 determines whether the detection values are abnormal or not, and if the detection values are abnormal, the determination component 701 outputs the different control signals to drive the warning component 703 to respectively send out the different warning signals. For example, if the determination component 701 determines that corresponding detection values obtained through detecting the battery 65 by the current feedback circuits are lower than a normal value, a voltage of the battery 65 is determined to be too low, then a control signal is sent out for warning that battery power is insufficient, and if the warning component 703 is the buzzer at this time, the warning component 703 sends out a sound warning signal with one long and two short sound; if the determination component 701 determines that the corresponding detection values obtained through detecting the battery 65 by the current feedback circuits are different from the normal value, the actuator 61 is determined to be over-current, then a control signal is sent out for warning that the actuator 61 is over current, and if the warning component 703 is the buzzer at this time, the warning component 703 sends out a sound warning signal with one long and three short sound; if corresponding detection values obtained through detecting the battery 65 by the heat sensing members 7021 are different from the normal value, a temperature of the battery 65 is determined to be abnormal, then a control signal is sent out for warning that the temperature of the battery 65 is abnormal, and if the warning component 703 is the buzzer at this time, the warning component 703 sends out a sound warning signal with one long and four short sound; if the determination component 701 determines that corresponding detection values obtained through detecting an interior of the controller 71 by the heat sensing members 7021 are different from the normal value, a temperature of the determination component 701 is determined to be abnormal, then a control signal is sent out for warning that the temperature of the determination component 701 is abnormal, and if the warning component 703 is the buzzer at this time, the warning component 703 sends out a sound warning signal with one long and five short sound; if the determination component 701 determines that corresponding detection values obtained through detecting the actuator 61 by the timing members 7022 are different from the normal value, a running time of the actuator 61 is determined exceed a standard and be abnormal, then a control signal is sent out for warning that the running time of the actuator 61 exceeds the standard and is abnormal, and if the warning component 703 is the buzzer at this time, the warning component 703 sends out a sound warning signal with two long and five short sound. Certainly, the warning component 703 may also inform a current power outputting status of the actuator 61 controlled by the controller 71. Specifically, the actuator 61 is preset to have at least two different rotating speed statuses and further provides corresponding speed limitations on the electric balance bike under different power outputting statuses; for example, the actuator 61 has three rotating speed statuses, including a first rotating speed status, a second rotating speed status, and a third rotating speed status, and if the warning component 703 is the buzzer at this time, the warning component 703 may respectively sound three times corresponding to the first rotating speed status, the second rotating speed status, and the third rotating speed status. Moreover, the power-on speed regulation control member 72 and the power-off brake control member 73 may also transmit a signal source to the determination component 701 through the controller 71 to determine whether there is abnormality or not.

According to the battery 65 and the brushless motor as the actuator 61 of the present disclosure, the battery 65 is small in size and light in weight, which is suitable for short-range/short-time riding by children; according to the power control system 71 of the present disclosure, the reset button 721 of the power-on speed regulation control member 72 cooperates with the power-off brake control member 73 to turn on or off power supply and control the actuator 61 to be in different rotating speed statuses to provide corresponding speed limitations on the electric balance bike, so as to control a running speed of the electric balance bike, the users can stably control the actuation of the actuator 61 according to the changes of operation programs, such as numbers and times of pressing the power-on speed regulation control member 72 or the power-off brake control member 73, operation of which is convenient and corresponding structural design is greatly simplified; compared with conventional electric scooters for sliding and learning walk, and the electric balance bike of the present disclosure provides a step for the children to get started with two-wheeled recreational vehicles and competitive vehicles, such as full-size off-road vehicles, downhill bicycles, gasoline off-road vehicles, etc., and provides an entertainment effect of a speeding bike, which allows the children to get in touch with accelerator systems in advance and trains strain capacities of the children for vehicle dynamics and emergency situations when driving, and further has great help for hand-eye coordination and future actual driving; moreover, the actuating assembly 6 is detected by using the power abnormality response system 70 to determine whether the actuating assembly 6 normally runs or not, if the actuating assembly 6 abnormally runs, different warning signals are respectively sent out, and the users may know which member in the actuating assembly 6 is abnormal and the reason thereof according to different warning signals, so that the abnormality may be conveniently and automatically eliminated, and riding safety is further improved. Furthermore, the reset button 721 of the power-on speed regulation control member 72 cooperates with the power-off brake control member 73 to turn on or off power supply and control the actuator 61 to be in different rotating speed to provide corresponding speed limitations on the electric balance bike, so as to control the running speed of the electric balance bike, the users can stably control the actuation of the actuator 61 through the power-on speed regulation control member 72 or the power-off brake control member 67, operation of which is convenient and corresponding structural design is greatly simplified.

To sum up, the present disclosure provides embodiments of the power control system of the electric balance bike, which submits as utility herewith; technical content and technical features of the present disclosure have been disclosed as above; however, those who skilled in the art may still make various alternatives and modifications without departing from spirits of the present disclosure based on the present disclosure. Therefore, protection scopes of the present disclosure should not be limited to those disclosed in the embodiments, but should include various substitutions and modifications without departing from the present disclosure, and are covered by the protection scopes of the present disclosure.

What is claimed is:

1. An electric balance bike comprising:

a bike frame comprising a seat at an intermediate position thereof, a head tube at a front end thereof, and a rear fork at a rear end thereof;

a front fork connected to a lower end of the head tube;

a handlebar connected to the head tube, the handlebar configured to control rotation of the front fork;

a front wheel connected to the front fork;

a rear wheel connected to the rear fork;

an actuating assembly arranged between the bike frame and the rear wheel, the actuating assembly comprising an actuator located below an intermediate section of the bike frame, a driving member located at an axle of the rear wheel, and a driving belt that is wrapped around the actuator and the driving member;

a battery detachably connected to the actuating assembly; and a power control system comprising a controller, a power-on speed regulation control member, and a power-off brake control member, the controller being respectively electrically connected to the actuator and the battery, the power-on speed regulation control member and the power-off brake control member are located at the handlebar and are respectively connected to the controller to control the battery to supply power or not and set power outputting statuses of the actuator according to changes of an operation program of the controller, so that a highest running speed of the electric balance bike is controlled; and wherein the controller further comprises a power abnormality response system comprising a determination component, detection components, and a warning component; wherein the determination component is respectively connected to the detection components and the warning component, the detection components respectively detects running statuses of the actuator and the battery and outputs detection values, the determination component receives the detection values and determines whether the detection values are abnormal or not to output different control signals to drive the warning component to respectively send out different warning signals; and wherein the detection components are connected to the power-on speed regulation control member and the power-off brake control member, and comprise voltage feedback circuits, current feedback circuits and heat sensing members, the battery is connected to the voltage feedback circuits, so that a voltage of the battery is detected to confirm an electric quantity of the battery; and the actuator is connected to the current feedback circuits, so that a current of the actuator is detected; and wherein the heat sensing members are respectively connected to the battery, the actuator, the power-on speed regulation control member, and the power-off brake control member for detecting running temperatures; and wherein the detection components comprise timing members, the timing members are connected to the actuator, the battery, the power-on speed regulation control member, and the power-off brake control member for detecting running times; and wherein the warning component is a buzzer, and when the determination component determines that corresponding detection values obtained through detecting the battery by the current feedback circuits are lower than a normal value, a voltage of the battery is determined to be too low, so that a control signal is sent out for warning that battery power is insufficient, and the warning component sends out a sound warning signal with one long and two short sound; and wherein when the determination component determines that the corresponding detection values obtained through detecting the battery by the current feedback circuits are different from the normal value, the actuator is determined to be over-current, so that a control signal is sent out for warning that the actuator is over current, and the warning component sends out a sound warning signal with one long and three short sound; and wherein when corresponding detection values obtained through detecting the battery by the heat sensing members are different from the normal value, a temperature of the battery is determined to be abnormal, so that a control signal is sent out for warning that the temperature of the battery is abnormal, and the warning component sends out a sound warning signal with one long and four short sound;

and wherein when the determination component determines that corresponding detection values obtained through detecting an interior of the controller by the heat sensing members are different from the normal value, a temperature of the determination component is determined to be abnormal, so that a control signal is sent out for warning that the temperature of the determination component is abnormal, and the warning component sends out a sound warning signal with one long and five short sound; and wherein when the determination component determines that corresponding detection values obtained through detecting the actuator by the timing members are different from the normal value, a running time of the actuator is determined exceed a standard and be abnormal, so that a control signal is sent out for warning that the running time of the actuator exceeds the standard and is abnormal, and the warning component sends out a sound warning signal with two long and five short sound.

2. The electric balance bike of claim 1, wherein the power-on speed regulation control member and the power-off brake control member are respectively arranged at a left side and a right side of the handlebar, and the power-on speed regulation control member comprises a reset button and a speed regulator.

3. The electric balance bike of claim 2, wherein the battery starts to supply power when the reset button is continuously pressed at a predetermined time; and the power outputting statuses of the actuator is switched when the power-off brake control member and the reset button are continued to be pressed.

4. The electric balance bike of claim 2, wherein the buzzer is configured to inform the power outputting statuses of the actuator.

5. The electric balance bike of claim 4, wherein the power control system further comprises a display, the display is connected to the controller and is configured to display power statuses of the battery.

6. The electric balance bike of claim 5, wherein the display is integrated to the power-on speed regulation control member.

7. The electric balance bike of claim 5, wherein the display is a meter, and the reset button is integrated on the meter.

8. The electric balance bike of claim 1, wherein the controller controls the power outputting statuses of the actuator, so that the actuator has at least two different rotating speed statuses.

9. The electric balance bike of claim 1, wherein the battery is a rechargeable lithium battery for hand tools.

10. The electric balance bike of claim 6, wherein when the power control system is not in use, after a preset time, the electric balance bike enters an automatic turn-off mode; or when the electric balance bike is detected to be fault or the battery is detected to be out of power, the buzzer sends out a sound signal with one long and two short sound cooperating with squawks for informing users; or when using the speed regulator of the power-on speed regulation control member to operation, the reset button is not acted.

* * * * *